United States Patent [19]

Mickelson

[11] 4,127,989

[45] Dec. 5, 1978

[54] METHOD FOR SEPARATING METAL VALUES FROM BRINE

[75] Inventor: Grant A. Mickelson, Yorba Linda, Calif.

[73] Assignee: Union Oil Company of California, Brea, Calif.

[21] Appl. No.: 872,104

[22] Filed: Jan. 25, 1978

[51] Int. Cl.² ............................................. C01G 1/12
[52] U.S. Cl. ..................................... 60/641; 165/45; 423/42; 423/50; 423/93; 423/101; 423/141; 423/195; 423/561 R; 423/561 B; 423/21; 75/108
[58] Field of Search .................... 60/641; 423/37, 42, 423/43, 50, 101, 102, 93, 141, 195, 561 R, 561 B, 566; 75/108

[56] References Cited

U.S. PATENT DOCUMENTS

| | | | |
|---|---|---|---|
| 1,292,075 | 1/1919 | Rossberg et al. | 423/37 |
| 1,793,906 | 2/1931 | Christensen | 423/42 |
| 3,258,066 | 6/1966 | Hoffman | 166/4 |
| 3,751,673 | 8/1973 | Sprankle | 290/52 |
| 3,757,516 | 9/1973 | McCabe | 60/641 |
| 3,951,794 | 4/1976 | Swearingen | 210/58 |
| 4,043,129 | 8/1977 | McCabe et al. | 60/641 |
| 4,063,418 | 12/1977 | Shields | 60/641 |

FOREIGN PATENT DOCUMENTS 748593  5/1956  United Kingdom ................ 423/561 R

OTHER PUBLICATIONS

Christopher et al., "The Recovery and Separation of Mineral Values from Geothermal Brines", Hazen Research, Inc., U.S. Bureau of Mines Open File Report 81-75 pp. 1-36, Jun. 12, 1975.

Berthold et al., "Process Technology for Recovering Geothermal Brine Minerals", Hazen Research, Inc. U.S. Bureau of Mines Open File Report 35-75 pp. 136-154 Feb. 4, 1975.

Skinner et al., "Sulfides Associated with the Salton Sea Geothermal Brine", *Economic Geology*, vol. 62, 1967 pp. 316-330.

White, "Environments of Generation of Some Base-Metal Ore Deposits", *Economic Geology*, vol. 63, 1968, pp. 301-335.

*Primary Examiner*—Brian Hearn
*Attorney, Agent, or Firm*—Richard C. Hartman; Dean Sandford

[57] ABSTRACT

A process for separating and recovering metal values and salts from brine, such as brine produced from a subterranean geothermal reservoir, in which the brine is pressurized to above the bubble point pressure and thereafter a precipitating agent, such as a soluble sulfide, is added to the brine to form insoluble metal sulfide precipitates. The precipitates are separated from the brine while maintaining the brine at a pressure above the bubble point pressure, and the hot brine is subsequently utilized to derive energy therefrom. The brine effluent after such energy derivation and the precipitate are optionally processed to primarily recover saleable salts and metal values, respectively.

12 Claims, 1 Drawing Figure

METHOD FOR SEPARATING METAL VALUES FROM BRINE

BACKGROUND OF THE INVENTION

This invention relates to the production and treatment of geothermal brine, and more particularly, to the separation and recovery of heavy and transition metals present in produced geothermal brines.

As conventional hydrocarbon fuel reserves have been depleted, a worldwide emphasis has been placed on developing alternative energy resources, such as geothermal energy. Geothermal energy is generated by producing steam, hot water or hot aqueous brines from a subterranean geothermal reservoir and utilizing the produced fluid in conjunction with surface equipment, such as turbines and heat exchangers, to derive useful energy therefrom.

Most hot aqueous geothermal brines which are produced from subterranean formations for the purpose of energy derivation contain substantial quantities of salts such as sodium chloride, calcium chloride and potassium chloride. These hot aqueous brines may also contain substantial quantities of dissolved heavy and transition metal ions, such as silver, copper, lead, zinc, manganese and iron, and are usually saturated with silica. As these brines are produced via wells penetrating a subterranean geothermal reservoir, the pressure thereon is reduced and the brines begin to boil or flash thereby forming a two phase mixture of liquid and vapor. Commensurate therewith is a temperature drop which causes the precipitation and deposition of heavy and transition metal sulfides and some precipitation of silica resulting in fouling of the processing piping and equipment. Further, since most of the sulfide ion, present as hydrogen sulfide, is immediately separated from the brine along with other noncondensible gases in a separator at the wellhead, approximately less than 1 weight percent of the metal ions present in the produced geothermal brine are precipitated during production of the brine as just described. Therefore, since the majority of these metal ions remain in solution with the brine they will not only cause subsequent scaling and corrosion problems within the processing apparatus but will also contaminate the brine rendering the recovery and purification of salts therefrom a difficult task. Metals such as iron, manganese and zinc, which usually are the most abundant metals found in the brine, promote deposition of silica scale and may also cause corrosion of the processing apparatus.

In view of this problem, several techniques have been advanced to substantially eliminate scaling resulting from the production of geothermal brines. One process involves adding an agent such as sodium sulfate to a produced, hot geothermal water prior to passing the water through a heat exchanger so as to generate non-scaling precipitates. Such precipitates are readily separated from the hot geothermal water after it has passed through the heat exchanger. It has been proposed to utilize downhole pumps in conjunction with such process to compensate for the pressure drop concomitant with production of geothermal brine and, therefore, substantially eliminate boiling or flashing of the brine.

Another prior art process discloses the selective precipitation and subsequent recovery of certain valuable components of geothermal brines. More particularly, iron, manganese, zinc and lead can be precipitated as hydrous oxides, lithium can be precipitated as a complex lithium aluminate compound, and barium and strontium can be precipitated as sulfate salts. In addition to recovering these valuable components, salts such as sodium chloride and potassium chloride, can be recovered from the brine by suitable means such as, solar evaporation ponds. However, a need exists for an improved process for separating and recovering metal values from geothermal brine which is more efficient and more economical than the prior art processes.

Accordingly, it is an object of the present invention to provide a process for producing and processing hot geothermal brines containing, inter alia, salts and heavy and transition metal ions, wherein uncontrolled precipitation and scaling is substantially reduced.

It is also an object of the present invention to provide a process for the removal and recovery of valuable metals present in hot geothermal brines prior to energy derivation from the brine.

It is a further object of the present invention to provide for the precipitation of heavy and transition metal ions present in produced geothermal brines upon the addition of a single precipitating agent to the brine.

These and other objects and advantages of the invention will be apparent from the following detailed description and drawing.

BRIEF SUMMARY OF THE INVENTION

Briefly, the present invention relates to a process for separating and recovering metal values and salts from brine, such as brine produced from a subterranean geothermal reservoir, in which the brine is pressurized to a pressure above the bubble point pressure thereof to maintain only a liquid phase brine. Thereafter, an aqueous solution of a soluble sulfide, preferably such as an alkali metal or ammonium sulfide or polysulfide, is added to the brine thereby increasing the pH and forming insoluble metal sulfide precipitates. The brine is then passed through a suitable filter at a pressure above the bubble point pressure to remove the precipitates therefrom and is then utilized in deriving useful energy. The recovered precipitates are processed for their metal values and, the brine effluent after such energy derivation can be processed by any suitable means, such as by precipitation and crystallization in solar evaporation ponds, to recover saleable salts.

BRIEF DESCRIPTION OF THE DRAWING

The invention will be more readily understood by reference to the accompanying drawing which depicts a schematic flow diagram of the process of the present invention for separating metal values from hot brine.

DETAILED DESCRIPTION

Figure 1:
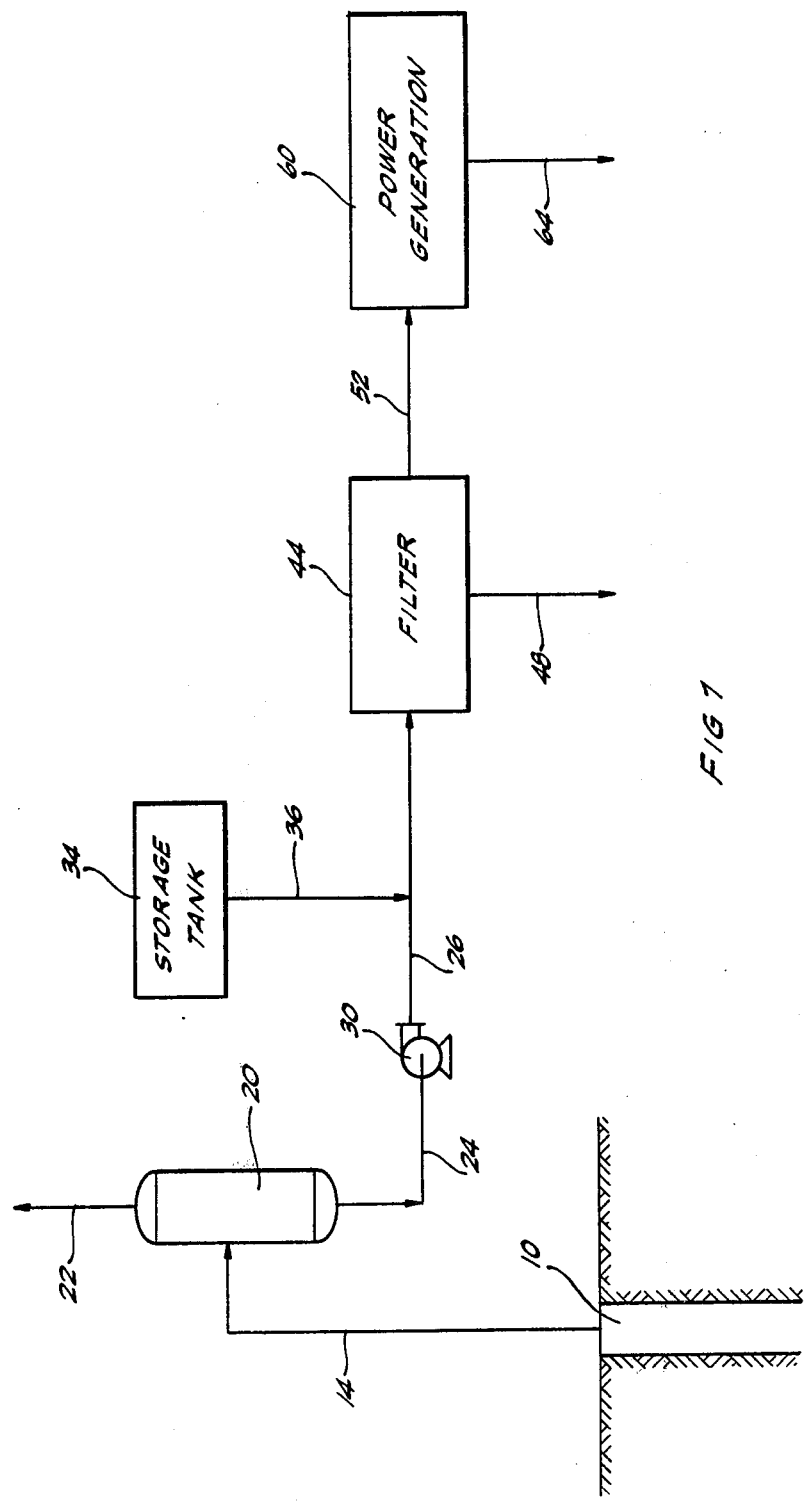

The present invention relates to a process for removing substantially all of the heavy and transition metals present in produced geothermal brines prior to energy derivation therefrom, thereby substantially eliminating scaling and other problems associated with such metals. In addition, the present invention relates to the recovery of valuable metals and salts from geothermal brines. As employed throughout this specification the terms "heavy metals" and "heavy metal ions" are meant to include metals having a density greater than 4 and the ions thereof. Examples of heavy metals are manganese, iron, copper, silver, lead and zinc. "Transition metals" and "transition metal ions" as used throughout the specification denote elements having partially filled d and f electron orbital shells. Specifically, "transition metals"

and "transition metal ions" are intended to include the elements having atomic numbers 21 through 29 (scandium through copper), 39 through 47 (yttrium through silver), 57 through 79 (lanthanium through gold), and all known elements from 89 (actinum) and above and the ions thereof. Examples of transition metals commonly found in geothermal brine include manganese, iron, copper and silver. As is readily apparent, "transition metals" and "heavy metals" are not mutually exclusive terms.

As illustrated in FIG. 1, geothermal brine produced from well 10, which communicates with a subterranean geothermal reservoir, is transported via conduit 14 to a suitable separator 20 wherein the brine is separated into a vapor phase containing steam and noncondensible gases and a liquid phase. The vapor phase, which will usually contain appreciable quantities of carbon dioxide and hydrogen sulfide, exits the top of flash vessel 20 via conduit 22 and is discharged directly to the atmosphere, if it is environmentally acceptable. If not, the vapor phase is transported to a unit where the hydrogen sulfide content thereof is reduced to a level such that the gas is rendered suitable for discharge into the atmosphere. The brine exits the bottom of the flash vessel via conduit 24. Prior to being flashed the geothermal brine will typically be at a temperature of about 300° F. to 600° F. and is produced at a wellhead pressure of about 300 to 700 p.s.i.g.

The brine conduit 24 is pressurized by any suitable means, such as, for example, by means of pump 30, to a pressure above the bubble point pressure of the brine. The bubble point pressure of geothermal brine is that pressure at which the brine begins to release steam and/or gases from solution. Maintaining the pressure of the brine above the bubble point pressure thereof ensures that the brine remains in the liquid phase at a relatively constant temperature and pressure thereby substantially eliminating any premature and unwanted precipitation due to a pressure drop and concomitant decrease in temperature. Alternatively, the geothermal brine may be pressurized to above the bubble point pressure thereof as it is being produced by means of, for example, a downhole pump (not illustrated). In this latter embodiment, the need for a wellhead separator is obviated since the produced geothermal brine is maintained as a liquid phase fluid. However, a surface pump may be necessary to insure against a pressure drop of sufficient magnitude to form a two-phase fluid, as will be evident to the skilled artisan. In eliminating the wellhead separator, the precipitation of a small amount of heavy and transition metals associated therewith and problems caused by such precipitation are also eliminated.

A precipitating agent is transported from tank 34 via conduit 36 and added to the pressurized brine in conduit 26. This precipitating agent is any soluble sulfur compound which will ionize in an aqueous medium to yield a divalent sulfur ion capable of forming an insoluble sulfide precipitate with heavy and/or transition metal ions. Preferably, the compound is a soluble sulfide such as an alkali metal or ammonium sulfide or polysulfide, exemplary of which are sodium sulfide, sodium polysulfide, ammonium sulfide or ammonium polysulfide. Most preferably, the compound is sodium sulfide or sodium polysulfide. Calcium sulfide for polysulfide is not preferred for use as the precipitating agent in the process of the present invention due to the fouling nature of calcium. These sulfide precipitating agents are added directly to the brine in conduit 26 as an aqueous solution thereof. The precipitating agent is added in a quantity sufficient to precipitate substantially all of the heavy and transition metal ions present in the brine as heavy and transition metal sulfides. The brine pH will be raised to about 6 to 7 upon the addition of such a quantity of precipitating agent thereby insuring that the heavy and transition metal sulfides will be insoluble in the brine and therefore precipitate therefrom.

The precipitating agent added to the pressurized brine in conduit 26 will substantially eliminate subsequent scaling caused by heavy and transition metal ions in downstream processing piping and equipment. The precipitation of the metal sulfides occurs rapidly thereby confining any precipitate formed to conduit 26. Further, the sulfide precipitated will absorb substantially all of the silicates suspended in the brine and also a substantial portion of the soluble silica present in the brine, thereby effectively reducing resultant scaling therefrom. In a few instances, the precipitate may not readily separate from the brine. Therefore, it may become desirable to clarify the brine by adding a small amount of suitable acid, preferably hydrochloric acid, to rapidly settle the precipitate from the brine.

Since the precipitates thus formed will cause scaling in conventional conduits, the internal surface of conduit 26 may consist of a scale resistant material. An example of a suitable scale resistant material is COR RECO 700, a phenol mercaptide marketed by Corrosion Research Company. This material may be applied as a coating to the internal surface of conduit 26.

Subsequently, the brine and precipitate in conduit 26 are transported to a suitable high pressure filter 44 wherein the precipitated metal sulfides and silica are filtered from the brine and transported via conduit 48 to a suitable recovery facility as hereinafter described. The brine entering this filter is at a pressure above the bubble point pressure thereof. The pressure drop across the filter is small enough to ensure that the brine remains substantially in the liquid phase as the precipitates are being filtered therefrom but is sufficient to ensure an adequate flow of brine through the filter. Such pressure drop may be, for example, about 50 p.s.i.g. A suitable filter is any filter which can structurally withstand pressures above the bubble point pressure of the geothermal brine and effect separation of the precipitate from the liquid phase. An example of a suitable filter is one which is hydraulically jacketed to equalize the pressure on the filter housing. Alternatively, other conventional solids separation means, such as a continuous batch centrifuge, can be employed.

Since the filtering of the brine will normally be carried out as a batch operation, filter 44 may consist of a plurality of filters connected to conduit 46 in parallel (not illustrated). A suitable switch valve (not illustrated) may be utilized to direct the flow of the brine and precipitate to one of the filters until a significant pressure drop across the filter is observed, indicating the filter is packed with precipitate. At this point, flow is directed by the switch valve to another filter while precipitate is cleaned from the first filter. After a significant pressure drop is noticed in this second filter, flow of brine and precipitate is diverted by the switch valve to either a third filter or to the cleaned first filter, as dictated by the flow rate of the brine, amount of precipitate, and the amount of downtime necessary to clean a filter, inter alia.

It is important to note that the size of conduit 26 is dictated in part by the reaction kinetics of the reaction between the heavy and transition metal ions present in the brine and the precipitating agent. Conduit 26 must have a length such that the reaction of these metals ions and precipitating agent is substantially completed prior to entry of the brine and precipitates into filter 44.

The brine is drawn from the filter 44 via conduit 52 and is transported therein to a suitable facility such as power generation facility 60, as illustrated, to derive useful energy therefrom. The brine stream emanating from the power generating facility is conducted via conduit 64 to a suitable salt recovery facility, not illustrated. This salt recovery facility may be, for example, solar evaporation ponds, and the salts to be recovered from this facility include, inter alia, sodium chloride, potassium chloride and calcium chloride. Since this brine will normally contain other values, such as lithium, barium, and boron which are solubilized therein and may be saleable, known processes may be employed to remove these values from the brine.

The precipitate removed from the filter via conduit 48 may be separated into its component values by any suitable method, such as, for example, the following method. Initially, the precipitate is filtered and washed to remove any soluble chlorides. Alternatively, centrifugation or any other known method of liquid-solids separation may be employed to remove the soluble chlorides from the precipitate. Thereafter, the precipitate may be transported to any suitable process for separation and recovery of the metal values contained therein. Alternatively, the precipitate may be dried and sold as crude ore to existing, off-location plants for the recovery of the metal values. As an example of a suitable process for separation and recovery of metal values from these precipitates, the dried precipitates are roasted to form heavy and/or transition metal oxides. These oxides are then dissolved in a suitable solvent which may be an acid or a base. The metal values are then extracted from this solution in any suitable manner, as will be evident to the skilled artisan. Further, the sulfide content of the precipitate may be utilized to produce sulfuric acid, a saleable product, or treated to form, for example, sodium sulfide, and utilized as a precipitating agent in the process of the present invention.

It should be apparent to those skilled in the art that any known process for recovering metal values and saleable salts from the precipitate or the brine effluent of the power production facility may be employed in the process of the present invention.

The power generation facility illustrated in the drawing may employ any known process for generating power from geothermal brines. For example, the process may utilize an indirect contact heat exchanger wherein the brine indirectly heats either a vaporizing heat transfer fluid or indirectly heats a nonvaporizing heat transfer fluid which in turn heats a working fluid. Alternatively, the brine may be utilized in a direct heat exchange wherein the brine directly heats a suitable working fluid. Or the brine may be employed in a multistage flash process wherein the brine is partially flashed to a vapor phase in successive stages at lower pressures. A working fluid is indirectly heat exchanged with the produced vapor phases and is thereafter utilized to produce mechanical energy. The vapor phase will condense upon heat exchange with the working fluid and such condensate may be combined with the brine prior to entry into one of the flashing stages.

In any event, the process of the present invention is not intended to be restricted to any particular process or facility for deriving useful energy from geothermal brines but may be utilized in conjunction with any suitable energy derivation process.

The following example is illustrative of the application of the present invention to separating and recovering metal and salt values from geothermal brine. Since this example is illustrative of only one embodiment of my invention, it is not to be construed as limiting the scope thereof.

EXAMPLE

Geothermal brine present in a subterranean geothermal formation at a temperature of about 500° F. and a pressure of about 600 p.s.i.g. is pressurized by means of downhole pumps to a pressure above 700 p.s.i.g. to maintain the brine as a single phase liquid. This brine is produced via wells pentrating the formation at a rate of 6 million pounds of brine per hour 72,000 tons per day) and has a composition as set forth in Table 1.

TABLE 1

| CONSTITUENT | CONCEN-TRATION ppm | CONSTITUENT | CONCEN-TRATION ppm |
|---|---|---|---|
| Sodium | 50,400 | Iodine | 18 |
| Potassium | 17,500 | Sulfide | 16 |
| Lithium | 215 | Boron | 390 |
| Rubidium | 137 | Iron | 2,090 |
| Cesium | 16 | Manganese | 1,560 |
| Ammonia | 409 | Silver | 0.8 |
| Calcium | 28,000 | Copper | 8 |
| Magnesium | 54 | Lead | 84 |
| Barium | 235 | Zinc | 790 |
| Strontium | 609 | Arsenic | 12 |
| Chlorine | 155,000 | Antimony | 0.4 |
| Fluorine | 15 | $CO_2$ as $HCO_3$ | 150 |
| Bromine | 120 | Silica | 400 |

An aqueous solution of sodium sulfide is added to the brine, which is maintained at a pressure above 700 p.s.i.g. by surface pumps when necessary, and forms insoluble metal sulfide precipitates. The brine is thereafter passed through a filter at above 700 p.s.i.g. to remove the precipitates therefrom and then utilized in a multistage flash process to produce mechanical energy. The brine effluent from the mulitate flash process is first processed for lithium, barium, strontium and boron, and thereafter is transported to solar evaporation ponds where sodium chloride, potassium chloride and calcium chloride and recovered. These salts may be further processed to remove other values listed in Table 1 therefrom, such as bromine, iodine, and boron. Precipitates are periodically cleaned from the filter and are processed in a suitable facility to recover silver, copper, lead, zinc, manganese and iron. The total recovery per day is set forth in Table 2.

TABLE 2

| CONSTITUENT | RATE OF RECOVERY |
|---|---|
| Metals | lbs./day |
| Silver | 115 |
| Copper | 1,115 |
| Lead | 12,096 |
| Zinc | 113,160 |
| Manganese | 224,640 |
| Iron | 288,000 |
| Crystallized Salts | tons/day |
| Sodium Chloride | 5,542 |
| Potassium Chloride | 2,334 |
| Calcium Chloride | 5,584 |
| Other Values | lbs./day |

TABLE 2-continued

| CONSTITUENT | RATE OF RECOVERY |
|---|---|
| Lithium | 30,960 |
| Strontium (recovered as a sulfate) | 86,400 |
| Barium (recovered as a sulfate) | 33,840 |
| Bormine | 17,280 |
| Iodine | 2,592 |
| Boron | 56,160 |

Even though the present invention has been described as a process for recovering and separating metal values and salts from geothermal brine, the process of the present invention is not limited in application to geothermal brines but may be utilized in conjunction with any brine containing recoverable heavy and transition metal values.

While various embodiments and modifications of this invention have been described in the foregoing description, further modifications will be apparent to those skilled in the art. Such modifications are included within the scope of this invention as defined by the following claims.

I claim:

1. A process for separating and recovering metal values from hot brine containing dissolved heavy metal ions and/or transition metal ions, which comprises:
   (a) pressurizing said brine to a pressure in excess of the bubble point pressure of said brine;
   (b) adding an aqueous solution of a soluble sulfur compound to said pressurized brine to form insoluble heavy and/or transition metal sulfide precipitates while maintaining said pressurized brine at a pressure in excess of the bubble point of said brine;
   (c) separating said insoluble precipitates from said pressurized brine while maintaining said pressurized brine at a pressure in excess of the bubble point pressure of said brine; and
   (d) recovering metal values from said separated insoluble heavy and/or transition metal sulfide precipitates.

2. The process of claim 1 wherein said soluble sulfur compound is sodium sulfide.

3. The process of claim 1 wherein said insoluble precipitates are filtered from said pressurized brine while said pressurized brine is maintained at a pressure in excess of the bubble point pressure of said brine.

4. The process of claim 1 which further comprises:
   (e) deriving useful energy from said brine from which said insoluble precipitates have been separated.

5. The process of claim 1 wherein said metal values are manganese, iron, copper, silver lead and/or zinc.

6. A process for separating and recovering metal values from hot geothermal brine containing dissolved heavy metal ions and/or transition metal ions, which comprises:
   (a) pressurizing said geothermal brine to a pressure in excess of the bubble point pressure of said geothermal brine:
   (b) adding an aqueous solution of a soluble sulfide to said pressurized geothermal brine to form insoluble heavy and/or transition metal sulfide precipitates while maintaining said pressurized brine at a pressure in excess of its bubble point pressure, said soluble sulfide being selected from the group consisting of an alkali metal or ammonium sulfide or polysulfide;
   (c) separating said insoluble precipitates from said pressurized geothermal brine while maintaining said pressurized brine at a pressure in excess of the bubble point pressure of said geothermal brine; and
   (d) recovering metal values from said separated insoluble heavy and/or transition metal sulfide precipitates.

7. The process of claim 6 wherein said soluble sulfide is sodium sulfide.

8. The process of claim 6 wherein said insoluble precipitates are separated from said pressurized geothermal brine by filtration.

9. The process of claim 6 which further comprises:
   (e) deriving useful energy from said geothermal brine from which said insoluble precipitates have been separated.

10. A process of claim 6 wherein said metal values are manganese, iron, copper, silver, lead and/or zinc.

11. A process for separating and recovering metal values from a geothermal brine having at a temperature of about 500° F. or above and containing dissolved heavy metal ions and/or transition metal ions which comprises:
    (a) pressuring said geothermal brine to a pressure of about 700 p.s.i.g., said pressure being in excess of the bubble point pressure of said geothermal brine;
    (b) adding an aqueous solution of sodium sulfide and/or sodium polysulfide to said pressurized geothermal brine to form insoluble heavy and/or transition metal sulfide precipitates while maintaining said pressurized geothermal brine at a pressure in excess of its bubble point pressure;
    (c) filtering said insoluble precipitates from said pressurized geothermal brine in a high pressure filter while maintaining said pressurized geothermal brine at a pressure in excess of its bubble point pressure.
    (d) recovering metal values from said filtered insoluble heavy and/or transition metal sulfide precipitates; and
    (e) deriving useful energy from said geothermal brine from which said insoluble precipitates have been filtered.

12. The process of claim 11 wherein said metal values are manganese, iron, copper, silver, lead and/or zinc.

* * * * *